United States Patent

Schluter et al.

[15] 3,660,612

[45] May 2, 1972

[54] COMMON CONTROL TELEPHONE SWITCHING SYSTEM EMPLOYING ADDED DATA WIRE

[72] Inventors: Heinz Schluter, Kornwestheim; Hilmar Schonemeyer, Stuttgart, both of Germany

[73] Assignee: International Standard Electric Corporation, New York, N.Y.

[22] Filed: June 29, 1970

[21] Appl. No.: 56,088

Related U.S. Application Data

[63] Continuation of Ser. No. 635,873, May 3, 1967, abandoned.

[30] Foreign Application Priority Data

May 11, 1966 Germany ..............................St 25370

[52] U.S. Cl. ..........................................................179/18 D
[51] Int. Cl. ........................................................H04m 3/38
[58] Field of Search ........................179/18 D, 27 DA, 18 FH

[56] References Cited

UNITED STATES PATENTS 3,387,094 6/1968 Siegel et al.........................179/18 FH
3,204,036 8/1965 Bray et al.............................179/18 D
2,779,824 1/1957 Nilsson et al. .....................179/18 FH

FOREIGN PATENTS OR APPLICATIONS 1,171,473 6/1964 Germany .............................179/18 D

*Primary Examiner*—Kathleen H. Claffy
*Assistant Examiner*—Thomas W. Brown

[57] ABSTRACT

Subscriber circuits and junctors are interconnected through data wires via a switching network. In addition to the normal speech wires from the subscriber lines, a separate data wire is provided. This added data transmission wire is used to transmit information through a data wire connection within the network. The data wires receive identifying pulses from a central control through connecting facilities. The data wires are connected to a common information channel via translators. All data concerning an identified connection, as e.g. subscriber number, class-of-service, position number or addresses of the participating switching multiples and the type and number of the junctor are made available over the common information channel to the central control facilities for evaluation.

3 Claims, 7 Drawing Figures

PATENTED MAY 2 1972 3,660,612

SHEET 1 OF 4

PATENTED MAY 2 1972

3,660,612

SHEET 3 OF 4

COMMON CONTROL TELEPHONE SWITCHING SYSTEM EMPLOYING ADDED DATA WIRE

This is a continuation of application Ser. No. 635,873, filed May 3, 1967, now abandoned.

The invention relates to an arrangement employing an added data transmission conductor throughout the network for deriving control information in telephone exchange systems using a central-controlled switching network.

In telephone exchange systems, it is necessary to provide certain items of information required to control the system. These items are required at different periods before or during the establishment of a connection, and during the call after the connection has been completed. The information items relate to the busy or idle switching condition, the class of service, and the position and identifying number of the equipment participating in the connection, as well as the connecting elements of the central control. In known systems, these information items are obtained by a series of different switching means. For example, a class-of-service translator spells out the class-of-service to an interrogating connecting element. An identification circuit furnishes the equipment location number or the directory number of a subscriber. The position numbers of the equipment are obtained through still other interrogating facilities. Consequently, in order to obtain the required control information items, a number of different means must be seized and the information items obtained therefrom must be stored frequently and held available during the establishment of a connection and while the connection is held. The resulting complexity of seizing and storing equipment can be avoided, if the switching means and translators are used again and again during different phases in establishing a connection.

The foregoing explanation shows that known systems derive control information items in a central-controlled switching network through the use of a plurality of switching processes. Also, the entire control information is a composite of information items which are taken at many different points, by many different devices, and at many different times.

Accordingly, an object of the invention is to provide a new and improved arrangement for deriving control information items in telecommunication systems. A further object of the invention is to provide telephone exchange systems with a central-controlled switching network which provides all control information items in the central control during each phase of the establishment of a connection. In this connection, an object is to provide simple access means for obtaining the information items required for the switching process as it is initiated.

According to one aspect of the invention, output devices of the system, such as subscriber stations and junctors, are interconnected through a data wire that can be connected through the switching network. The data wire of the output devices is connected to receive identifying pulses from the central control via auxiliary facilities. The data wire of the output devices and of the crosspoint arrangements are connected through translator means and a common information channel to an evaluating facility of the central control. Thus, all information items relative to the respective connection and the participating devices can be led to the central control with one single identifying pulse.

The control method is further explained by stating that the identifying pulse can be led directly to a data wire which is associated with the individual subscribers through a position number tree or a call number tree. Thus, a sort of integrated translator is provided which requires a minimum number of jumperings. There is access to the information items at any time without intermediate storage whenever the information items are required for the control process. Moreover, large parts of the translator can be extended together with the extension of the system.

Control information items of use in establishing the different connections are obtained in each possible variant. Translator means are connected to the data wires individually associated with the subscribers to provide the position number, i.e., equipment number, the call number, i.e., directory number and the class of services of the corresponding connection. Also, the translator means is connected to the data wire of the junctors for characterizing the type and the position number of the junctor.

The course which the connection takes through the switching network is considered because the links to the data wires are led through the switching networks over translator means to the common information channel. The translator means characterizes the position number of the switching multiple and the number of the link.

In order to obtain clear control information items, identifying pulses in the one-at-a-time method are received by the individual connection. Thus, it is also possible to simultaneously lead identifying pulses to several connecting points of a call connection.

The input and output ends of a junctor of the system are connected to the switching network. In order to determine the course of a connection into and out of a junctor, a further embodiment of the invention provides that a junctor is connected to a data wire at the input and at the output end and that the central control separately actuates these parts of the data wire.

If a system is subdivided into several control groups, the arrangement for deriving the control information items can be realized through a common, integrated translator. For a system subdivided into control groups, a common information channel and an identifying pulse distributor are provided. The distributor serves the individual control groups at different times.

The above mentioned and other features of this invention and the manner of obtaining them will become more apparent, and the invention itself will be best understood by reference to the following description of an embodiment of the invention taken in conjunction with the accompanying drawings, in which.

When establishing a connection over the switching stages Ks1 and Ks2 (FIG. 1) of the switching network KN, a data wire *d* is through-connected in parallel with the speech or control wires. A connection is established at this time over the data wire connecting the junctor VS and the subscriber circuit TS, as well as other facilities participating in the call connection.

The central control ZSt, (e.g. a marker) has access through a starting device (e.g. a scanner AzS or a register finder grid AnS) to the subscriber circuit TS, to the junctor VS, and to all other facilities participating in the connection about to be established. Also, this applies when the central control ZSt directly actuates the subscriber circuit TS via a position number tree PP or via a call number tree RP. The central control may be a marker. The nature of the position number tree and the call number tree is disclosed more fully in the description of subsequent drawings.

The central control ZSt may apply the identifying pulse Id to any one or several of the points A, B, C, or E. In any case, the evaluation device AW in the central control ZSt receives all associated information items through a common information channel IK. A position number translator PO connected to the data wire d of the subscriber circuit TS furnishes the position number of the subscriber line. The call number translator RO furnishes the call number of the subscriber circuit TS. Finally, a class-of-service translator KO furnishes all characteristics concerning the subscriber, such as rights-of-way granted, etc. The network translators N01 and N02 indicate the course of the connection as it is extended through the switching network KN. The junctor translator VS0 identifies the junctor VS which is participating in establishing the connection.

Figure 1:
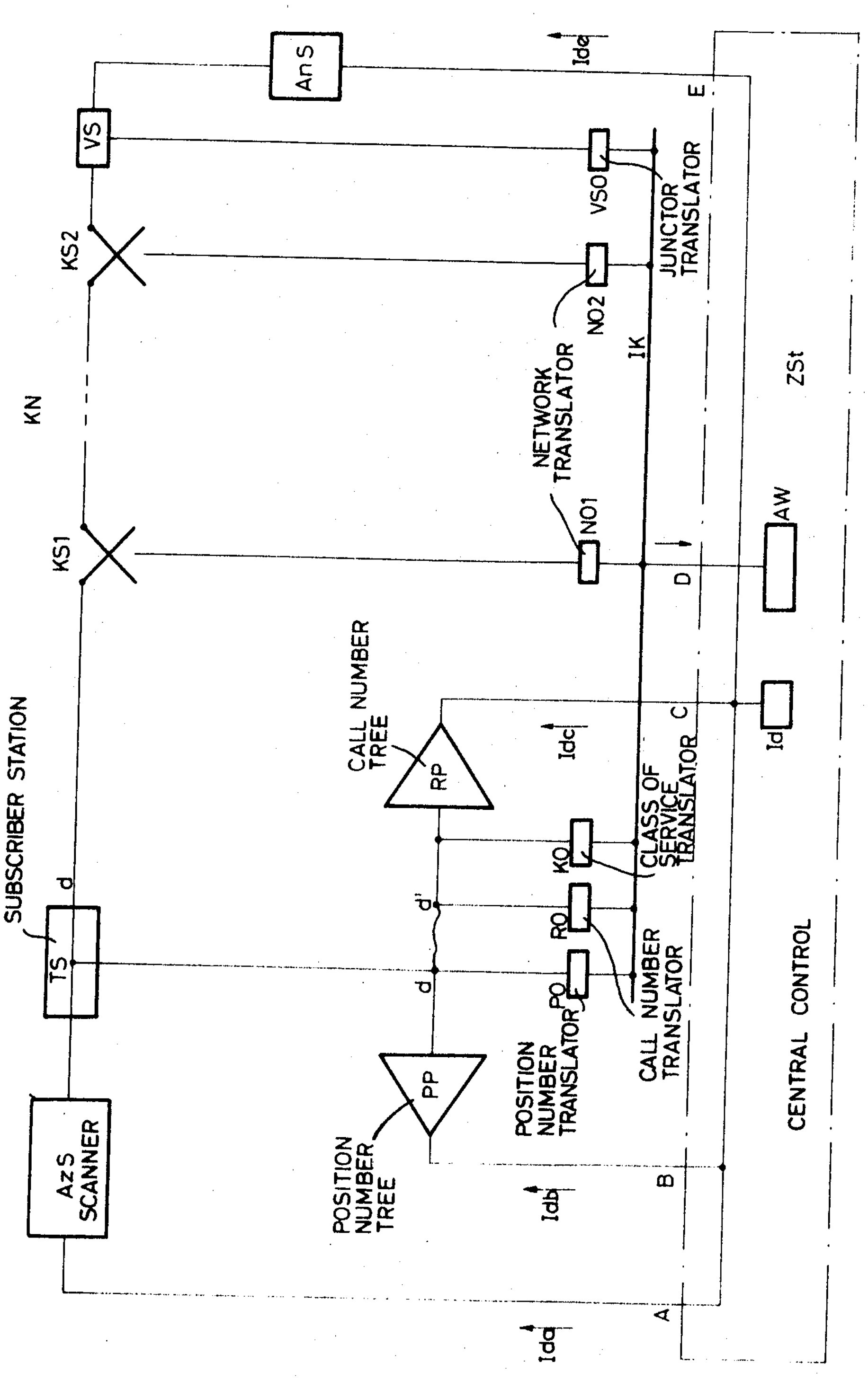
FIG. 1 shows a block diagram of a common controlled switching system having a control information retrieval arrangement according to the invention.

A few examples of system operation will now be explained in detail with the aid of FIG. 1.

OUTGOING CONNECTION

In an outgoing connection, the scanner AzS identifies the subscriber circuit TS which is demanding service. The scanner then marks the subscriber circuit TS and the data wire *d*. After the connection of the scanner AzS with the central control ZSt, the identifying pulse Ida is applied to point A. This pulse is applied directly to the data wire d via the subscriber circuit TS.

Through the information channel IK, the central control Zst receives the position number and the class of-services of the subscriber circuit TS. Upon the basis of these information items, a connection is made through the network KN to the junctor VS.

If, instead of an immediate marking of the subscriber circuit TS, the scanner AzS furnishes the position number as an address, the position number tree PP is set to evaluate the position number. The central control ZSt then receives the position number and the class-of-services of the subscriber circuit TS responsive to an application of an identifying pulse Idb through the position number tree PP. The pulse Idb is then applied to the data wire d of this subscriber circuit TS.

In some systems, the call number is the same as the position number or equipment location of the subscriber circuit TS. If so, the points *d* and *d'* are identical, the point *d* is connected to the pint *d'*, and only one of the trees PP or RP is provided. In other systems, the call number and the position number of a subscriber circuit TS are different. If so, the points *d* and *d'* are associated in an arbitrary manner which represents the true state of the numbers. In an arrangement according to the invention, a single-wire connection is sufficient for this translation. The identification can be performed in both traffic directions through this translator connection.

TERMINATING CONNECTION

When connections are extended to a called line and no association exists between the equipment location position number and the called number, the identification is made via the position number tree PP without a direct connection between the scanner AzS and the subscriber circuit TS. When there is an association between the position number and the called number, the call number tree RP is set at a terminating connection. The central control ZSt applies the identifying pulse Idc to the connecting point C and thus to the call number tree RP. The central control ZSt receives the position number of the called subscriber through the wire *d–d'* and the position number translator PO.

At the same time, the class-of-service identification can be obtained through the class-of-service translator KO via the output of the call number tree RP. It is not important whether the class-of-services information items are obtained from the side of the position number tree PP or the call number tree RP.

After the evaluation of these information items, the connection to the called subscriber line is established in response to signals from the central control ZSt. If the called subscriber circuit TS is busy, its data wire d is through connected to a junctor VS. Besides the position number and the class-of-services of the desired subscriber, the central control ZSt receives information, through the translators N01, N02, and VS0, about the established connecting path and the seized junctor VS. This information indicates whether the called subscriber circuit TS is busy, whether the called subscriber is in a PABX, and whether the subscriber circuit TS is connected with an internal junctor or with a trunk line junctor. Depending on these conditions, the exchange equipment represented here by the control ZSt may take any appropriate action.

If a connection is made to a PABX, the operator wants to know the identity of the specific junctor which is connected with the subscriber circuit TS. To provide this information, the central control ZSt applies the identifying pulse Ide to the connecting point E. The call number of the connected subscriber circuit TS is then given by the call number translator RO over a path traced through the common information channel IK, translator VSO, the junctor VS, the through-connected data wire *d*, the subscriber circuit TS, and the jumpering *d–d'*.

In telephone exchange systems, a series of subscriber identifications is evaluated when a calling subscriber has sent dial information and the called subscriber is busy. The class-of-service of he calling subscriber, identified via the through-connected data wire, is checked to determine whether the calling subscriber circuit TS is authorized to complete the indicated connection. The class-of-service of the calling subscriber circuit TS need not be stored intermediately in the register.

When it is necessary to check which output devices are connected through which switching multiples and links of the switching network KN, the identifying pulse is applied to the participating equipment. The information items furnished by the network translators N01 and N02, appear on the information channel IK. These information items mark the switching multiple and the number of the link, i.e. the addresses of the participating switching elements. Such an identification of switching elements is of particular importance when certain connections have been partially released.

Frequently, it is necessary during terminating connections to make a busy test at the called subscriber circuit TS. Breaking in on busy lines can be prevented by applying the identifying pulse to the data wire d via the trees PP or RP. The number of connections ending at this data wire d in the output switching multiple is obtained through the information channel IK as well as the class-of-service applicable to the seized subscriber circuit TS.

Figure 2:
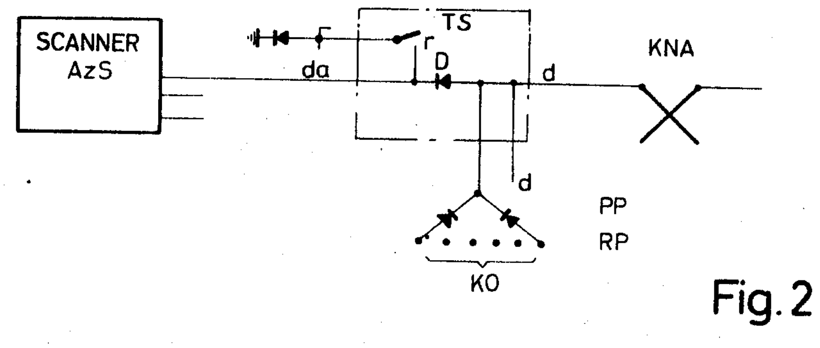
FIG. 2 to 4 show the connection of a class-of-service translator, of a position number translator, and of a call number translator to the data wire individual for each subscriber, respectively.
Figure 3:
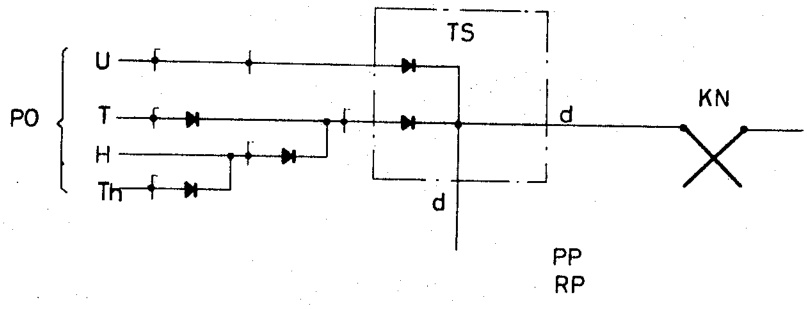
Figure 4:
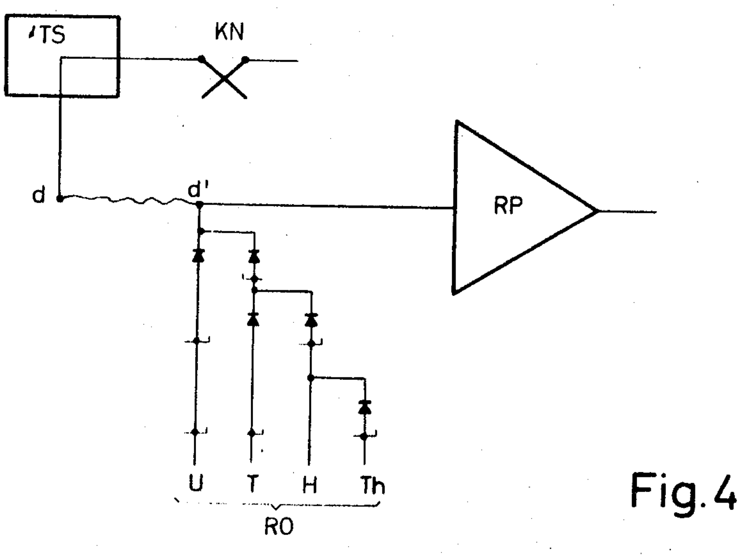

The FIGS. 2 to 4 show the connection of the class-of-service translator KO, the position number translator PO, and the call number translator RO. These translating elements are diode fields which are connected to the data wire d individually associated with each subscriber. The figures show that the respective translators KO, PO, and Ro can be actuated from the switching network KN via the subscriber circuit TS and the data wire *d*. The data wires *d*, individually associated with each subscriber, can also be actuated through the position number tree PP or the call number tree RP. At each actuation, all information items are obtained which characterize the corresponding subscriber circuit TS. At the output of the translators PO and RO, the information is given in either a decimal form, as the references Th H, T, U indicate, or in a coded form.

FIG. 4 shows the call number tree RP with the points *d'* jumpered corresponding to the association with the data wires d of the subscriber circuits TS. These data wires *d* are also reached by the outputs of the position number translator PO as shown in FIG. 3.

Figure 5:
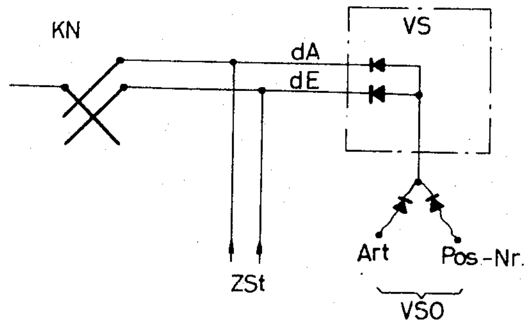
FIG. 5 shows means for actuating and identifying a junctor.

FIG. 5 shows a junctor VS connected to the switching network KN at the input and at the output end. The data wires dE and dA can be actuated individually, as indicated by the two control wires, arriving from the central control ZSt. The symbol DE represents input of the data wire into the connector whereas DA represents output of the data wire from the connector. Each of these may connect through the register finder grid to the central control. In any case, the type and the position number of the junctor is forwarded to the common information channel IK via the junctor translator VSO, connected to the junctor VS.

Figure 6:
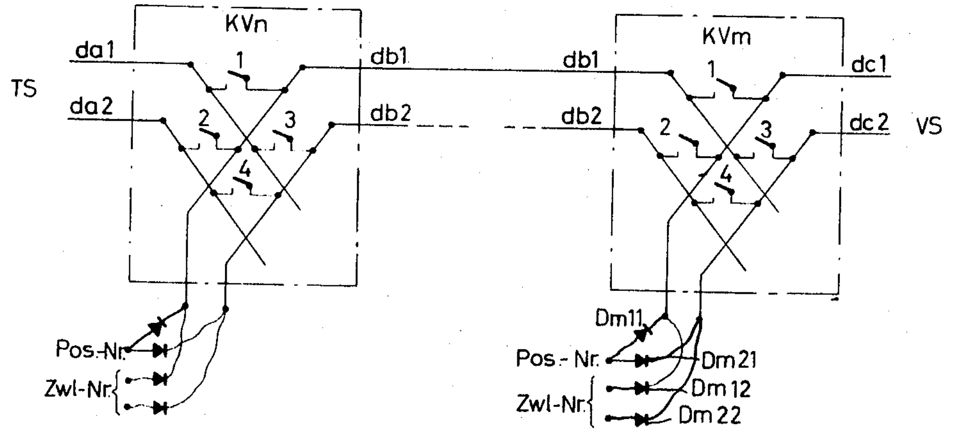
FIG. 6 shows means for identifying the switching multiple and the precise link in the multiple.

According to FIG. 6, the switching multiples KVn and KVm are a part of the switching network KN. If the links da1, db1, and dc1 participate in a connection, the contact 1 in the switching multiple KVn and KVm is closed. The associated wires in the data network are also connected. If an identifying pulse arrives on the data wire d from the junctor VS or the subscriber circuit TS, this pulse also reaches the switching multiples KVn and KVm. In the switching multiple KVm, the identifying potential is applied to the diodes Dm11 and Dm12. The position number of the switching multiple KVm is obtained via the diode Dm11 and the number of the seized link db1 is obtained via the diode Dm12. All diodes of the switching multiple are connected to the position number point. Multiples of all diodes of the even-numbered outputs of the switching multiples of said stage are obtained at the link numbering points (Zwl–Nr).

Figure 7:
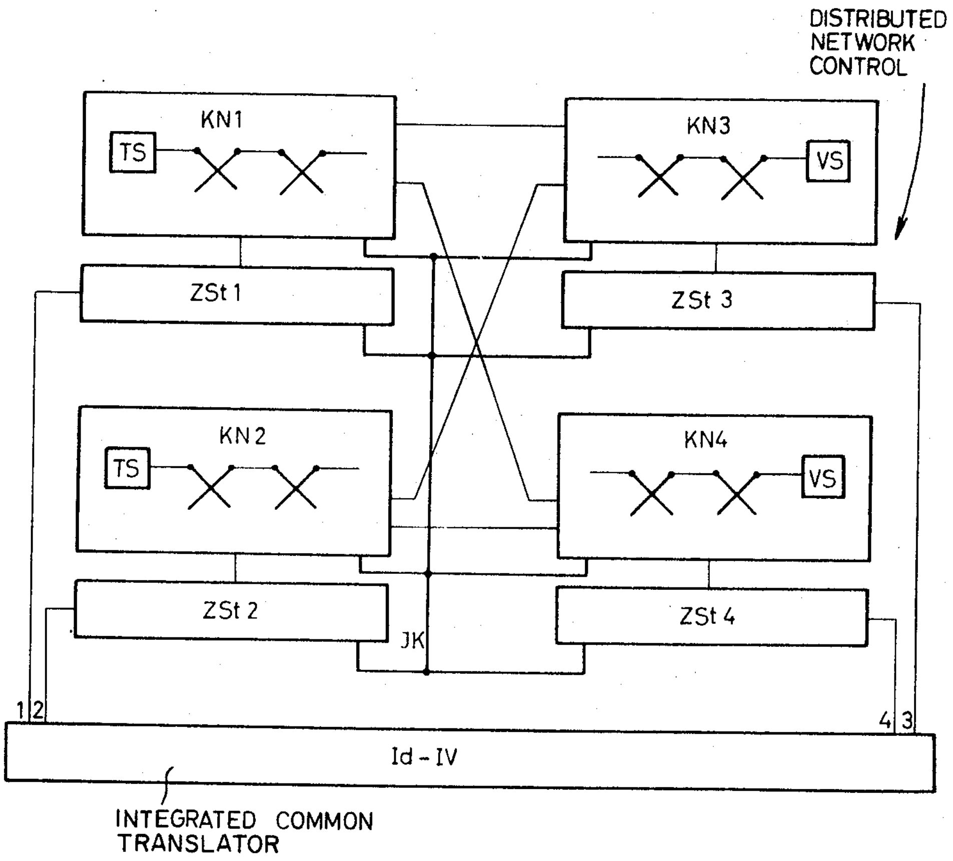
FIG. 7 shows an arrangement by which an integrated common control is used to regulate individual control groups.

In a telephone exchange, several control groups may operate independently of each other. If so, a common integrated translator can be used through an identifying pulse distributor Id–IV, as shown in FIG. 7. The pulse distributor permits only one control group ZSt1 to ZSt4 to gain access to the integrated translators of the control groups at any given time. This enables the system to obtain information items for each control group from the different system parts through a common information channel IK. As indicated in FIG. 7 the identifying pulses 1 to 4 are applied to the control groups cyclically by the pulse distributor.

With the translator means N01 and N02 (FIG. 1), the number of the subscribers participating in a connection can be investigated in a simple way. If the data wire *d*, individually associated with each subscriber, receives an identifying pulse, the number of the connections starting from this subscriber are obtained automatically from the identities of the switching multiples and of the links.

While the principles of the invention have been described above in connection with specific apparatus and applications, it is to be understood that this description is made only by way of example and not as a limitation on the scope of the invention.

We claim:

1. An arrangement for transmitting items of supervisory and call control information in a telephone system having a switching network controlled from a central control circuit, a plurality of telephone stations within said system, a plurality of speech wires connecting each of said stations to said network, the invention comprising a data wire connecting each of said stations to said network, means for extending a data wire connection from a station included in setting up a call through said network for carrying information items within said network, means extending said data wire connection from the network to the central control circuit, means in said central control circuit responsive to the extension of said connection for applying identifying pulses over said data wire, means coupled to said data wire connection and individually responsive to applied pulses for supplying information to a common information channel directed to said central control circuit, and evaluating means connected to receive information from said common information channel for processing said information items.

2. The arrangement as claimed in claim 1, wherein supplying means comprise a plurality of translators, each adapted to provide an item of call control information for transmission through said network and control circuit.

3. The arrangement as claimed in claim 2, wherein said pulse applying means comprises a pulse distribution means for controlling access to said translators in sequence.

* * * * *